United States Patent
Bensimon et al.

(10) Patent No.: US 7,543,737 B2
(45) Date of Patent: Jun. 9, 2009

(54) METHOD FOR RECHARGING A SUBSCRIPTION CARD USING WIRELESS EQUIPMENT

(75) Inventors: Michael Bensimon, Grenoble (FR); Philippe Caloud, Saint Ismier (FR); Nicolas Prunel, Grenoble (FR)

(73) Assignee: Societe Francaise du Radiotelephone, Paris (FR)

( * ) Notice: Subject to any disclaimer, the term of this patent is extended or adjusted under 35 U.S.C. 154(b) by 574 days.

(21) Appl. No.: 11/116,957

(22) Filed: Apr. 28, 2005

(65) Prior Publication Data

US 2005/0269399 A1   Dec. 8, 2005

(30) Foreign Application Priority Data

May 5, 2004   (FR) ................... 04 04847

(51) Int. Cl.
*G06K 5/00* (2006.01)

(52) U.S. Cl. .................. 235/380; 235/379; 235/492

(58) Field of Classification Search ................. 235/380, 235/379, 382, 383, 385, 487, 492
See application file for complete search history.

(56) References Cited

U.S. PATENT DOCUMENTS 5,577,109 A * 11/1996 Stimson et al. .......... 379/114.2
6,308,887 B1 * 10/2001 Korman et al. ............... 235/379
7,093,761 B2 * 8/2006 Smith et al. ............. 235/462.07
7,191,939 B2 * 3/2007 Beck et al. ................... 235/380
7,280,984 B2 * 10/2007 Phelan et al. ................. 705/76

FOREIGN PATENT DOCUMENTS

| WO | WO 98/47112 | 10/1998 |
| WO | WO 00/33264 | 7/2000 |
| WO | WO 01/75816 A1 | 10/2001 |
| WO | WO 02/071311 A2 | 9/2002 |

* cited by examiner

*Primary Examiner*—Daniel St. Cyr

(57) ABSTRACT

This invention relates to a device for recharging a contactless smart card (1) including a recharge kiosk (2) that can have an identifier specific to it and capable of communicating with a contactless smart card (1), a mobile terminal (3) provided with a recharge management program (33) capable of communicating with a recharge server (4) through any type of communication means, means of payment through a communication network and an identity module, and a recharge server (4), characterised in that the mobile terminal (3) includes shape reading means (31) for acquisition of the identifier of the kiosk (2), and its corresponding recharge method.

13 Claims, 7 Drawing Sheets

METHOD FOR RECHARGING A SUBSCRIPTION CARD USING WIRELESS EQUIPMENT

CROSS-REFERENCE TO RELATED APPLICATIONS

Figure 1:
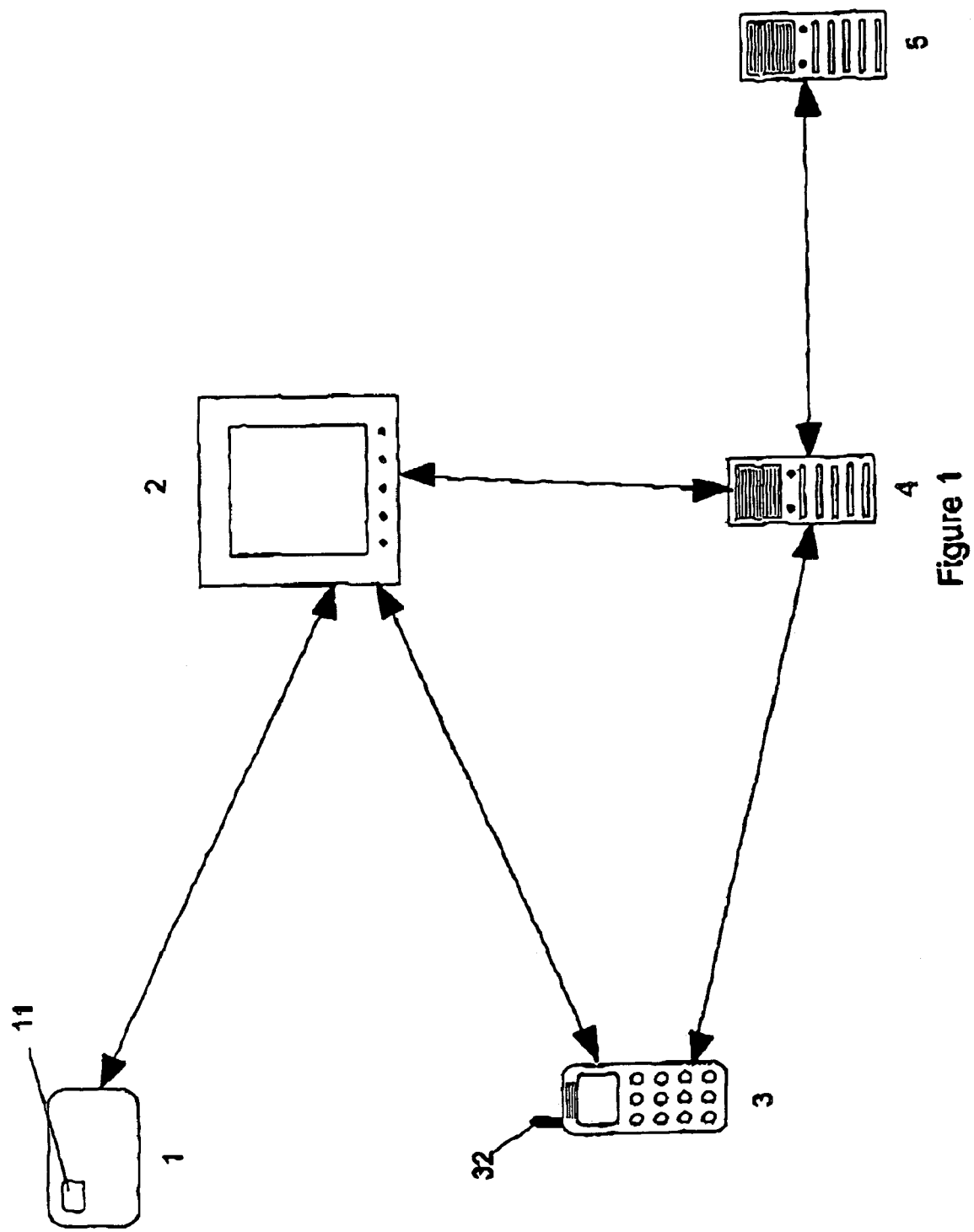

This application claims priority from French Patent Application No. 04 04847, filed on May 5, 2004.

This invention relates to a method for recharging a subscription card using wireless equipment, applicable particularly to the telecommunications field.

The use of contactless smart cards for widespread distribution is known in prior art. This technology is widely distributed in several industries, including transport and leisure. In the transport industry, magnetic tickets and mechanical ticket validation machines are replaced by contactless smart cards and appropriate kiosks. Similarly, in the leisure industry, ski resorts use a similar technology to replace their fixed fees. One of the major disadvantages in using such cards is that they have to be recharged fairly frequently. This recharge requires the use of traditional payment means such as a bank card or cash payment.

The telecommunications domain, and particularly the telephony domain, is major consumer of rechargeable cards. This is why telephony operators offer a large number of methods to their users for recharging their cards.

A first method consists of the user purchasing a recharge coupon or ticket. This coupon is in the form of a card or a paper ticket on which the number of the recharge is marked, and the user then enters this number into his telephone to recharge his consumption credit.

A second method consists of recharging the card through an automatic cash dispenser. The operation takes place in the same way as a simple cash withdrawal, except that the dispenser has a function used to recharge telephony cards, and in this case the customer's account is debited by the amount of the recharge.

A third recharge method consists of crediting the card by calling a special number with secure communications, and the user informs the operator of his credit card number and chooses the amount to be credited.

Another method consists of making an automatic monthly direct debit on the user's bank account to credit his card.

All these methods use conventional payment methods and each has various disadvantages for the card user, although they are all flexible in use. Recharge coupons oblige the user to enter a large number of digits to activate the recharge, which involves the risk of making a mistake in the input and then for the user to start again the input from the beginning. Recharges by bank card are only possible if the user has an account allowing him to hold a credit card which limits access to this service. Furthermore, some card users are unwilling to give their credit card number by telephone, although the communication for this type of transaction is very secure. Finally, recharging by monthly direct debit restricts the user's freedom in his choice of whether or not to recharge his card.

The purpose of this invention is to overcome some of the disadvantages of prior art by proposing a method of recharging contactless cards using a mobile terminal by means of a combination of new image acquisition capabilities of mobile terminals through telecommunications networks, interaction means with contactless smart cards enabling recharging through a kiosk and interaction means between a kiosk and a payment infrastructure.

This purpose is achieved using a method for recharging a contactless smart card used by a device comprising a recharge kiosk, that can have an identifier specific to it and capable of communicating with a contactless smart card, a mobile terminal provided with shape reading means for acquisition of a kiosk identifier if there is one, a recharge management program capable of communicating with a recharge server through any type of communication means, means of payment through a communication network and an identity module, a recharge server, characterised in that the method includes:

a step in which the recharge kiosk displays a barcode possibly composed of the kiosk identifier, possibly the transaction identifier, authentication or kiosk data, and if the communication step does not take place the barcode only contains the transaction identifier, a step to acquire information displayed in the previous step by the shape reading means on the mobile terminal, a communication step between the mobile terminal recharge management program and the recharge server during which the recharge management program transmits the barcode or part of the information contained in the barcode input during the previous step, and performs the transaction payment, a step in which the transaction payment is verified and the smart card kiosk is authenticated, this step being performed by the recharge server, a step for direct or indirect transmission from the recharge server to the data recharge kiosk, to credit the smart card, a transmission step between the recharge kiosk and the contactless smart card, to transmit information about completion of the transaction, and crediting the smart card.

According to another feature, the smart card identification step, the step in which the kiosk displays information on the card, the communication step between the kiosk and the recharge server, the step prompting the kiosk to start the recharge management program, and the step in which the kiosk acknowledges the recharge are all optional steps.

According to another feature, the recharge server may initiate payment instead of the recharge management program, during the communication step between the recharge management program and the recharge server.

According to another feature, if the credit system associated with the smart card is a central system, the recharge server directly credits the payment server, the method then changes from the payment verification step to the recharge acknowledgment step.

According to another feature, if the step to transmit data from the recharge server to the recharge kiosk takes place so that the smart card can be credited, the step to transmit data from the recharge server to the recharge management program does not take place, and vice versa.

According to another feature, the smart card can send a challenge that is transmitted to the recharge server that signs the challenge—transaction amount pair, and if the smart card recognises the signature of the recharge server, it credits the amount of the transaction to itself.

According to another feature, the security mechanism may be a TSL type trust mechanism with encryption of exchanges and mutual authentication between the smart card and the recharge server, this type of mechanism may be applied between the kiosk and the smart card.

According to another feature, when the credit is stored in the network and the recharge server and the recharge kiosk are not connected to each other, the method includes:

a step in which the recharge kiosk displays a barcode possibly composed of the kiosk identifier, possibly the transaction identifier, card or kiosk authentication data, and if the communication step does not take place the barcode only contains the transaction identifier, a step to input information displayed in the previous step, by the shape reading means on the mobile terminal, a communication step between the recharge management program on the mobile terminal and the recharge server during which the recharge management program transmits the barcode or part of the information extracted from the barcode input during the previous step, and performs the transaction payment, a payment/transaction verification and kiosk/smart card authentication step, being done by the recharge server, a step in which the recharge server transmits data to the recharge management program so that the smart card can be credited, the recharge management program being capable of displaying these data to the user and the user being able to transmit them to the recharge kiosk.

According to another feature, when the credit is stored in the network and the recharge server and the recharge kiosk are connected to each other, the method comprises:

a step in which the recharge kiosk displays a barcode possibly composed of the kiosk identifier, possibly the transaction identifier, card or kiosk authentication data, and if the communication step does not take place, the barcode only contains the transaction identifier, a step to input information displayed during the previous step by the shape reading means on the mobile terminal, a communication step between the recharge management program on the mobile terminal and the recharge server during which the recharge management program transmits the barcode or some of the information extracted from the barcode input during the previous step, and makes the transaction payment, a payment/transaction verification and kiosk/smart card authentication step, done by the recharge server, a step in which the recharge server transmits data to the recharge management program used to credit the smart card, the recharge management program possibly displaying these data to the user and the user being able to transmit them to the recharge kiosk.

According to another feature, when the credit is stored in the smart card and the recharge server and the recharge kiosk are not connected to each other, the method includes:

a step in which the recharge kiosk displays a barcode possibly composed of the kiosk identifier, possibly the transaction identifier, card or kiosk authentication data, and if the communication step does not take place, the barcode only contains the transaction identifier, a step to input information displayed during the previous step by the shape reading means on the mobile terminal, a communication step between the recharge management program on the mobile terminal and the recharge server during which the recharge management program transmits the barcode, or some of the information extracted from the barcode input during the previous step, and makes the transaction payment, a payment/transaction verification and kiosk/smart card authentication step, this step being done by the recharge server, a step in which data are transmitted from the recharge server to the recharge management program and are used to credit the smart card, the recharge management program being able to display these data to the user and the user being able to transmit them to the recharge kiosk, a transmission step between the recharge kiosk and the contactless smart card, to transmit information related to implementation of the transaction, and in this case the smart card is credited.

According to another feature, when the credit is stored in the smart card and the recharge server and the recharge kiosk are connected to each other, the method includes:

a step in which the recharge kiosk displays a barcode possibly composed of the kiosk identifier, possibly the transaction identifier, card or kiosk authentication data, and if the communication step does not take place, the barcode only contains the transaction identifier, a step to input information displayed during the previous step by the shape reading means on the mobile terminal, a communication step between the recharge management program on the mobile terminal and the recharge server, during which the recharge management program transmits the barcode, or part of the information extracted from the barcode input during the previous step, and makes the transaction payment, a payment/transaction verification and kiosk/smart card authentication step, this step being done by the recharge server, a step in which data are transmitted from the recharge server to the recharge kiosk and are used to credit the smart card, a transmission step between the recharge kiosk and the contactless smart card to transmit information related to execution of the transaction, and the smart card is then credited.

This purpose is also achieved by a contactless smart card recharging device comprising a recharge kiosk that may have an identifier specific to it, capable of communication with a contactless smart card, a mobile terminal on which a recharge management program is installed capable of communicating with a recharge server by any communication means, means of payment through a communication network and an identity module, and a recharge server, characterised in that the mobile terminal comprises shape reading means for acquisition of the kiosk identifier.

According to another feature, the shape reading means may be a digital camera.

According to another feature, shapes may be analysed entirely by the terminal, or the terminal may make use of remote functions in the network (that can be available for example on the recharge server).

According to another feature, the means of payment through a telecommunications network are of the SMS type.

According to another feature, the recharge kiosk may be interfaced with the recharge server using traditional communication means between an application and a kiosk.

According to another feature, the recharge kiosk may be interactive.

According to another feature, the recharge management program can be used to retrieve information about the recharge kiosk and the transaction to be done, and to transmit it to the recharge server.

Figure 2:
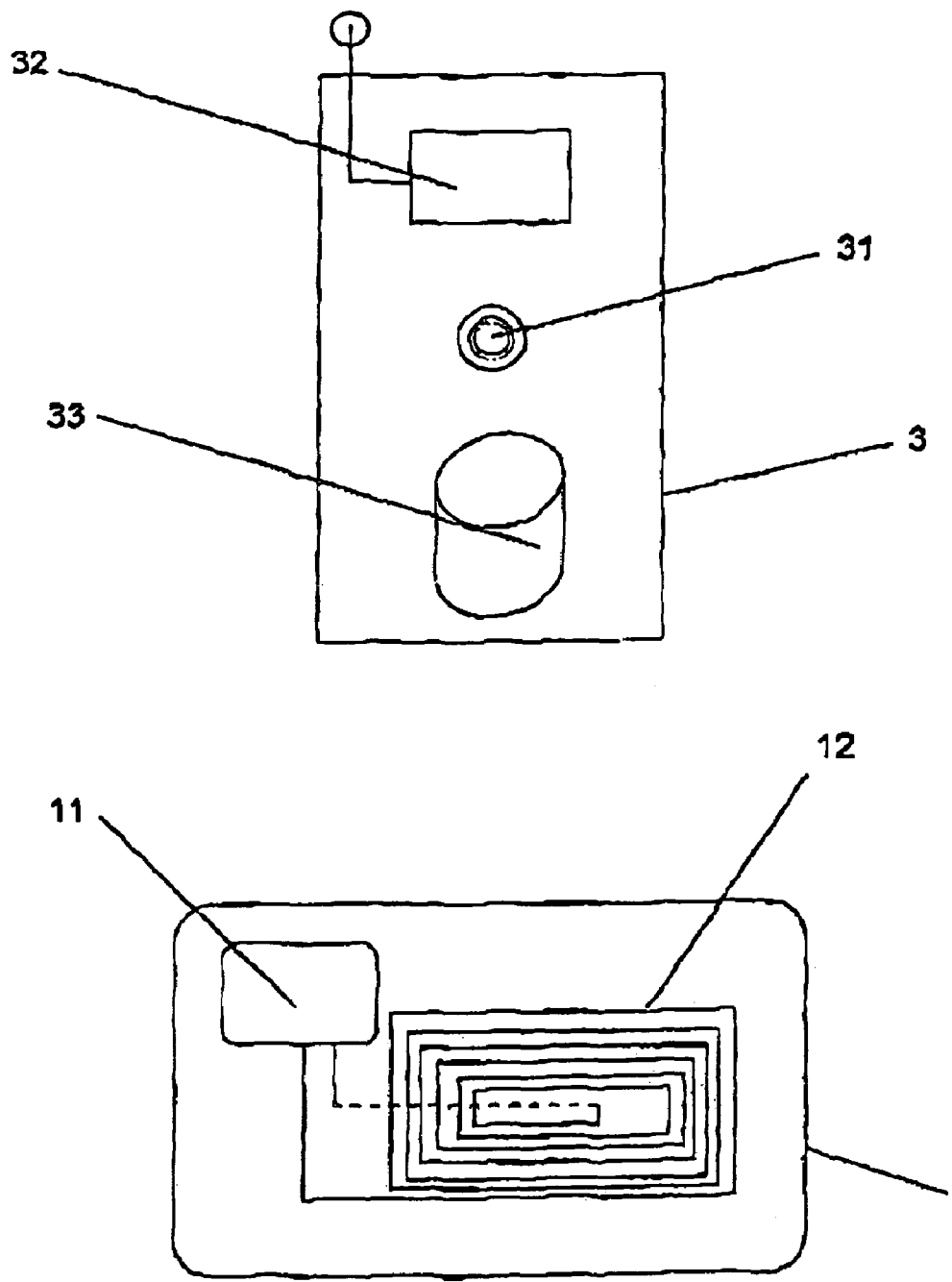
Figure 3:
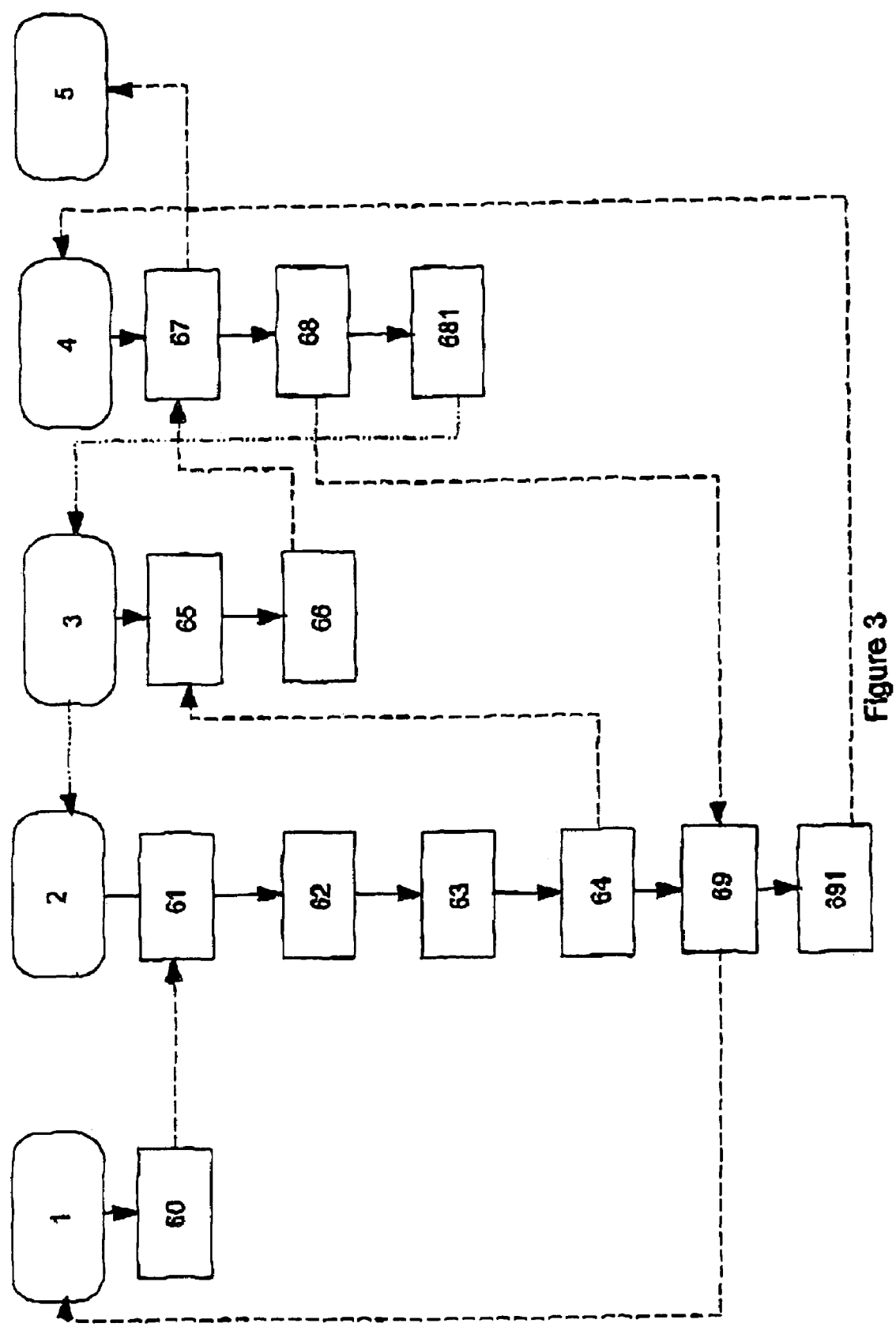
Figure 4:
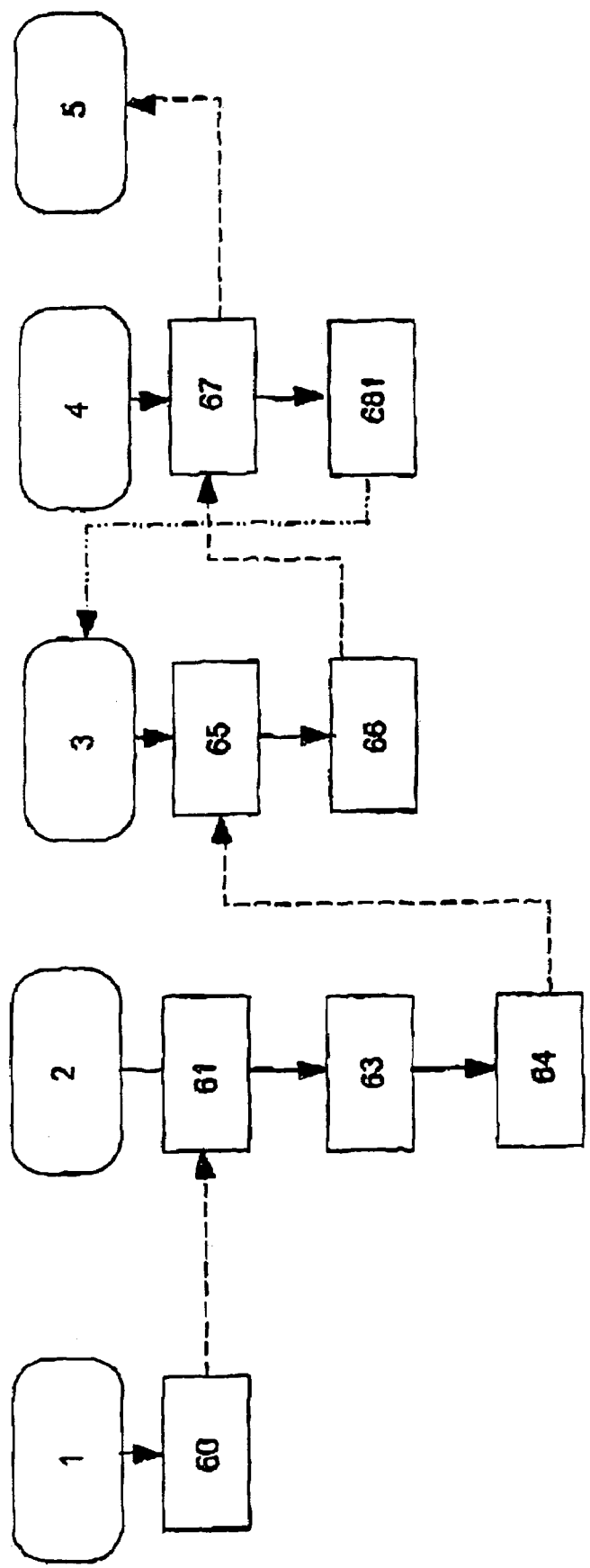
Figure 5:
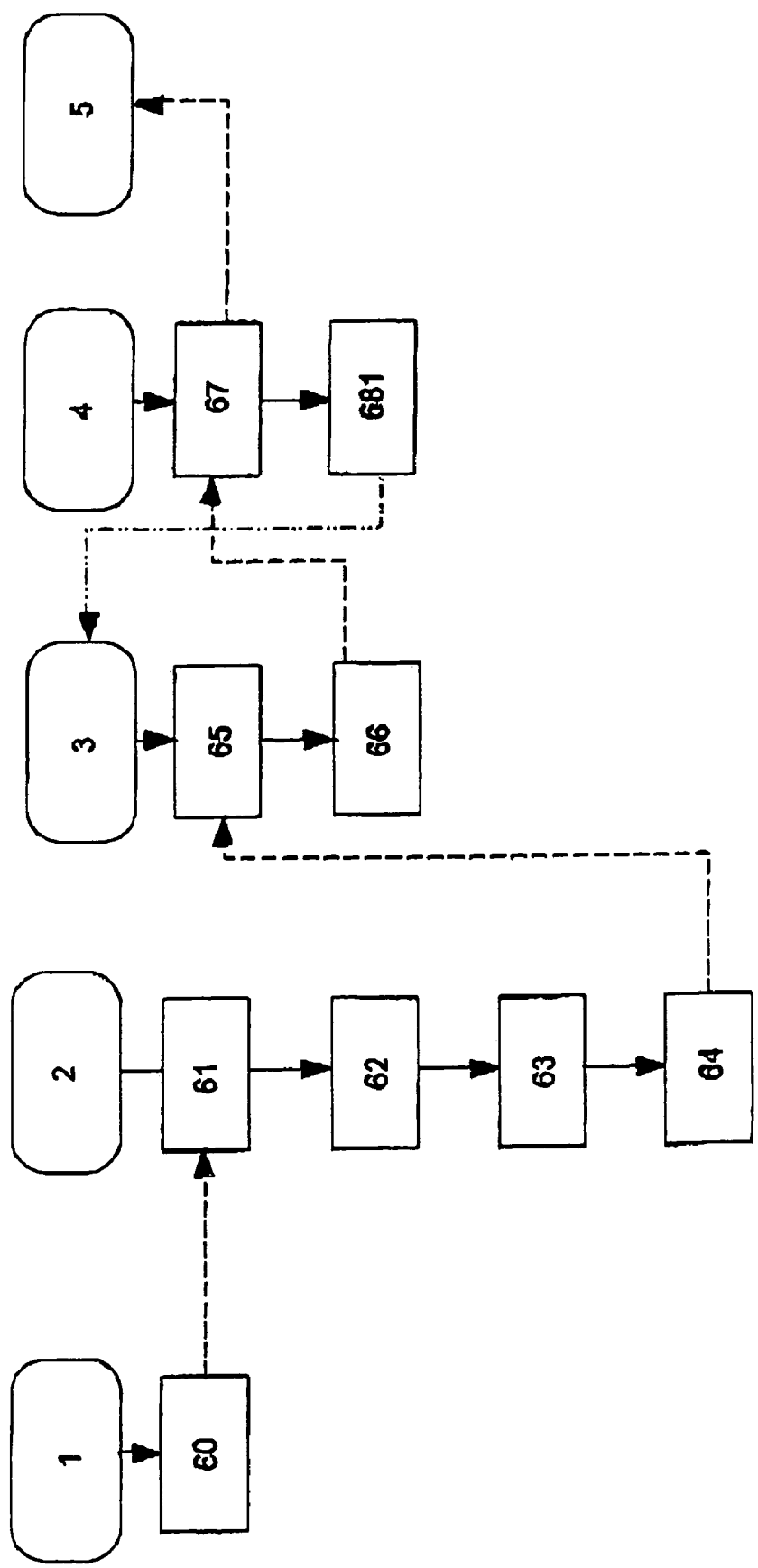
Figure 6:
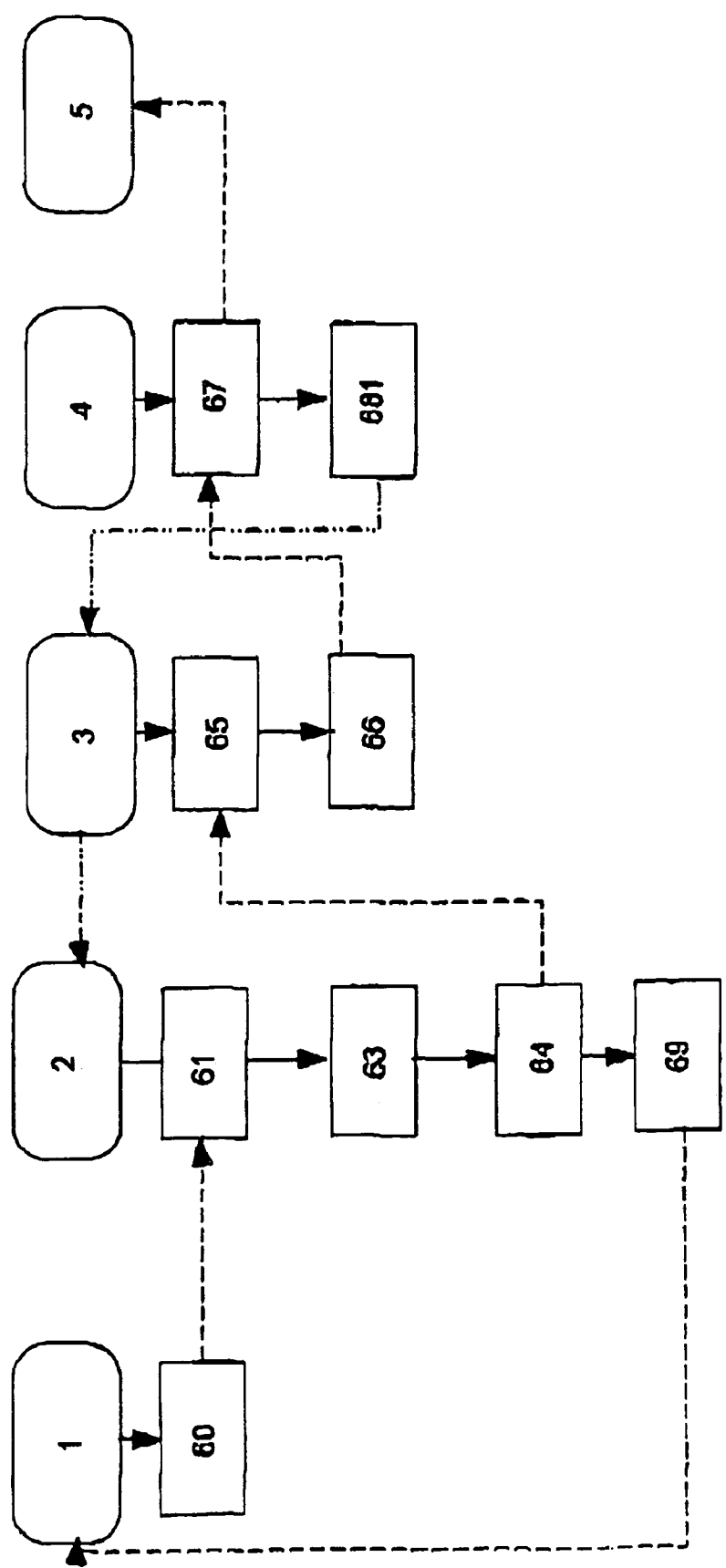
Figure 7:
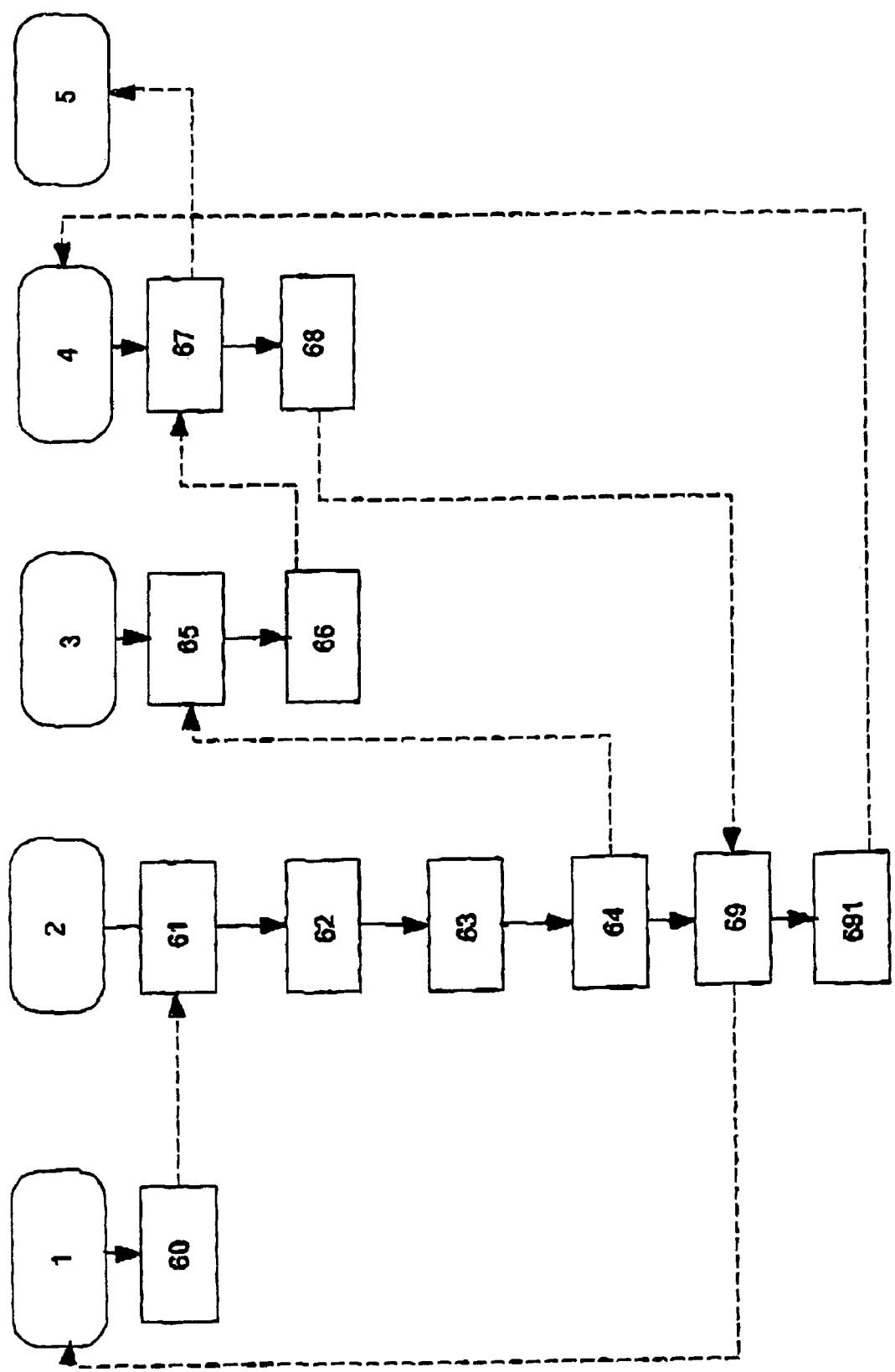

Other features and advantages of this invention will become clearer after reading the following description given with reference to the appended drawings, among which:

FIG. 1 shows a device in which the method according to the invention can be executed, FIG. 2 shows the main constituents of a mobile terminal and a contactless smart card used in performing the recharge method according to the invention, FIG. 3 shows a flow chart that includes the steps in the general method according to the invention, FIG. 4 shows a flow chart that includes the steps in the first implementation of the method according to the invention, FIG. 5 shows a flow chart that includes the steps in the second implementation of the method according to the invention, FIG. 6 shows a flow chart that includes the steps in the third implementation of the method according to the invention, FIG. 7 shows a flow chart that includes the steps in the fourth implementation of the method according to the invention, Appendix 1 shows a summary table of the various steps involved in the recharge method according to the invention, Appendix 2 shows the procedure for a generic case for recharging a contactless smart card according to the invention, Appendix 3 shows the procedure for the recharging method according to the invention when the credit is stored in the network and the kiosk and the recharge server are not connected to each other, Appendix 4 shows the procedure for the recharging method according to the invention when the credit is stored in the network and the kiosk and the recharge server are connected to each other, Appendix 5 shows the procedure for the recharging method according to the invention when the credit is stored in the card and the kiosk and the recharge server are not connected to each other, Appendix 6 shows the procedure for the recharging method according to the invention when the credit is stored in the card and the kiosk and the recharge server are connected to each other, As shown in the example of FIGS. 1 and 2, the device according to the invention includes a contactless smart card (1), a recharge kiosk (2), a mobile terminal (3), for example such as a GSM terminal, and a recharge server (4).

The contactless smart card (1) is a card comprising a chip (11) connected to an antenna (12) used for radio-frequency communication between the smart card (1) and a device capable of sending information to the chip or requesting the chip to transmit information. Contactless smart cards may for example be cards that use the RFId technology.

The recharge kiosk (2) interfaces with the contactless smart card (1) by conventional means of communication between a contactless smart card and a kiosk adapted to such a card. The recharge kiosk (2) may also be interfaced with a recharge server (4) by traditional means between an application and a kiosk. The recharge kiosk (2) may possibly be interactive, in other words it can communicate with the user so as to help him with his actions. Each recharge kiosk (2) may be characterised by an identifier specific to it and that is displayed to the kiosk user, for example in the form of a barcode.

The mobile terminal (3) is provided with a means of reading various shapes (31), particularly barcodes. The shape reading means (31) is a short distance reading means (of the order of one meter to a few tens of meters). This means (31) may be a CCD camera in a digital camera integrated into the mobile terminal. This CCD camera reads the electromagnetic waves emitted by the recharge kiosk (2) within a given wavelength range and transforms them into a digital signal that is then processed by a shape or character recognition software. In one preferred embodiment, this software may be entirely or partially remote in the network. The mobile terminal (3) is also provided with means of payment through a telecommunication network, for example such as sending an SMS. Finally, the mobile terminal (3) is provided with a contactless card recharge management program (33) that interacts with the recharge server (4) through any communication means.

Therefore, the mobile terminal (3) has two interfaces that are firstly conventional communication means by radio waves (32), and secondly means of capturing a shape (31). Furthermore, the mobile terminal (3) must have an identity module, for example such as a SIM card, so that the user can be clearly identified during recharging.

The recharge server (4) is interfaced with the mobile terminal (3) and its payment system due to communication means known in the telephony domain. It may also be interfaced with one or several recharge kiosks (2) that it may or may not be able to identify. The recharge server (4) is capable of identifying the recharge management program (33) through the SIM card and making the link between the SIM card and information about the user that is necessary for making the payment for recharging the card.

The recharge management program (33) on the mobile terminal (3) enables the user to identify the recharge kiosk (3), to retrieve information about the transaction through the barcode reading means (31) on the mobile terminal (3) and to input the recharge amount for his contactless smart card. The recharge management program (33) is also capable of communicating with the recharge server (4) by sending information to it about the transaction to be done and doing the transaction directly. This information includes information about identification of the user through the SIM card.

As shown in the example of FIG. 3, the general procedure for recharging a contactless smart card (1) comprises 11 steps. During the first step (60), the user puts his contactless smart card (1) onto the recharge kiosk (2), the kiosk (2) authenticates the card and the card transmits data to the kiosk (2) for mutual authentication and possibly a transaction identifier. During the second step (61), the recharge kiosk (2) displays specific information about the card (1) and the current transaction, this information possibly being the balance on the card and the choice of the recharge amount. During the third step (62), the kiosk (2) sends information necessary for the transaction to the recharge server (4), in other words the kiosk identifier if there is one, the card authentication data, the transaction amount and possibly a transaction identifier in order to make the procedure secure. In a fourth step (63), the kiosk (2) prompts the user to start the recharge management program (33). These first four steps (60, 61, 62, 63) are optional steps.

In a fifth step (54), the kiosk (2) displays a barcode composed of the kiosk identifier, possibly the transaction identifier, kiosk identification data and/or smart card identification data, and data that the user can use to contact the recharge server and finally the transaction amount. If the third step (62) took place, the barcode only contains the transaction identifier because the kiosk is already known to the recharge server (4). If step three (62) did not take place, identification data for the kiosk (2) and/or the smart card (1) must be transmitted to the recharge server (4).

In the sixth step (65), the user acquires the barcode displayed on the kiosk (2) using the capabilities for reading the barcode (31) integrated into his mobile terminal (3).

During the seventh step (66), the recharge management program (33) contacts the recharge server (4), makes the transaction payment and informs the recharge server about the payment and the transaction. In this step, the recharge server can trigger payment instead of the recharge management program.

In an eighth step (67), the recharge server (4) verifies the payment/transaction and authenticates the kiosk (2)/smart card (1). If the credit system associated with the card (1) is a central system, the recharge server (4) credits the payment server (5) directly, a transaction acknowledgement message possibly being sent to the recharge management program (33) and/or the kiosk (2). In this case, the procedure goes onto its eleventh step (691) directly.

In a ninth step (68), the recharge server (4) transmits data such as authentication data, etc., to the recharge kiosk (2) so that the card (1) can be recharged. Step (68) does not take place if the next step takes place.

During step nine B (681), the recharge server (4) acknowledges recharging to the recharge management program (33) that can then display this acknowledgement to the user. The recharge server also transmits data such as authentication data, etc., so that the card (1) can be credited. This information is sent from the recharge management program (33) to the recharge kiosk (2), possibly resulting from action by the user. Step (681) does not take place if the previous step (68) takes place.

In the tenth step (69), the user puts his contactless smart card (1) on the recharge kiosk (2). The recharge data are thus transmitted from the kiosk (2) to the card (1) and the card is credited.

The eleventh step (691) consists of an acknowledgement of the recharge by the recharge kiosk (2). This step (691) is an optional step.

Different security mechanisms may be set up during the steps in the recharging method according to the invention. For example, the contactless smart card (1) can send a challenge that is transmitted to the recharge server (4), the pair composed of the challenge and the recharge amount is then signed by the recharge server (4). The recharge amount and the signature of the recharge server (4) are sent to the smart card (1) that credits the transmitted amount to itself. The security mechanisms may for example be a TSL type trust mechanism with encryption of exchanges and mutual authentication between the smart card (1) and the recharge server (4). This device may be completed by setting up a mutual authentication mechanism and the usual encryptions in recharge kiosks (2) for contactless smart cards.

The method for which the steps are described above forms the general case for recharging a contactless smart card (1). However, a distinction between different cases has to be made in setting up this recharge method. These various cases depend on the storage location of the credit and the interconnection between the recharge kiosk (2) and the recharge server (4), or the lack of such an interconnection. This results in four options in the general recharge method.

As shown in the example of FIG. 4, the first implementation of the method concerns the case in which the credit is stored in the network and in which the recharge server (4) and the kiosk (2) are not connected to each other. In this implementation, a first step (60) consists of presenting the card (1) to the kiosk (2) with mutual authentication between the two entities.

During the second step (61), the kiosk (2) displays the amount of the balance on the card (1) and prompts the user to choose the recharge amount.

In a third step (63), the kiosk (2) prompts the user to start the recharge management program.

All these steps (60, 61, 63) are optional steps.

In a fourth step (64), the kiosk (2) displays a barcode composed of the identifier of the kiosk (2) and data related to the transaction.

In a fifth step (65), the user makes an acquisition of the barcode displayed by the kiosk (2) through data acquisition means on his mobile terminal (3).

In the sixth step (66), the recharge management program (33) transfers data related to the transaction to the recharge server (4).

In a seventh step (67), the recharge server (4) verifies the payment/transaction and authenticates the kiosk (2)/smart card (1).

In an eighth step (681), the recharge server (4) acknowledges the recharge to the recharge management program (33) that can present the display to the user. In this case, there is no information transmitted to the recharge kiosk (2), either by the recharge server (4) or by the recharge management program (33).

As shown in the example of FIG. 5, the second implementation of the recharge method relates to the case in which the credit is stored in the network and in which the recharge server (4) and the recharge kiosk (2) are connected to each other. In this implementation, a first step (60) consists of presenting the card (1) to the kiosk (2) with mutual authentication between the two entities.

During a second step (61), the kiosk (2) displays the amount of the balance on the card (1) and prompts the user to choose the recharge amount.

In a third step (62), the recharge kiosk (2) transmits its identifier, kiosk/card authentication data, the amount of the transaction and possibly security data to the recharge server (4).

In a fourth step (63), the kiosk (2) prompts the user to start the recharge management program. All these steps (60, 61, 62, 63) are optional steps.

In a fifth step (64), the kiosk (2) displays a barcode composed of the identifier of the kiosk (2) and data about the transaction.

In a sixth step (65), the user acquires the barcode displayed by the kiosk (2) using data acquisition means on his mobile terminal (3).

In a seventh step (66), the recharge management program (33) transfers information about the transaction to the recharge server (4).

In an eighth step (67), the recharge server (4) verifies the payment/transaction and authenticates the kiosk (2)/smart card (1).

In a ninth step (681), the recharge server (4) acknowledges recharging to the recharge management program (33) that can display it to the user.

In the two implementations of the method described above, the contactless smart card (1) does not contain any information about recharging at the end of the procedure, all it does is to help with identification at the beginning of the recharge procedure.

As shown in the example of FIG. 6, the third implementation of the recharge method relates to the case in which the credit is stored in the card and in which the recharge server (4) and the recharge kiosk (2) are not connected to each other. In this implementation, a first step (60) consists of presentation of the card (1) to the kiosk (2) with mutual authentication of the two entities.

During the second step (61), the kiosk (2) displays the amount of the balance on the card (1) and prompts the user to choose the recharge amount.

In a third step (63), the kiosk (2) prompts the user to start the recharge management program.

All these steps (60, 61, 62, 63) are optional steps.

In a fourth step (64), the kiosk (2) displays a barcode composed of the identifier of the kiosk (2) and data about the transaction.

In a fifth step (65), the user acquires the barcode displayed by the kiosk (2) using data acquisition means installed on his mobile terminal (3).

In a sixth step (66), the recharge management program (33) transfers information about the transaction to the recharge server (4).

In a seventh step (67), the recharge server (4) verifies the payment/transaction and authenticates the kiosk (2)/smart card (1).

In an eighth step (681), the recharge server (4) acknowledges recharging to the recharge management program (33) that can display it to the user. The recharge management program (33) transmits the information to the recharge kiosk (2) so that the smart card can be recharged.

In a ninth step (69), the user puts his smart card (1) on the recharge kiosk (2) so that data about recharging are transmitted to the card (1). The card is thus credited.

As shown in the example of FIG. 7, the fourth implementation of the recharge method applies to the case in which the credit is stored in the card and in which the recharge server (4) and the recharge kiosk (2) are connected to each other. In this option, the first step (60) consists of presenting the card (1) to the kiosk (2) with mutual authentication of the two entities.

During the second step (61), the kiosk (2) displays the amount of the balance on the card (1) and prompts the user to choose the recharge amount.

In a third step (62), the recharge kiosk (2) transmits its identifier, kiosk/card authentication data, the amount of the transaction and possibly security data, to the recharge server (4).

In a fourth step (63), the kiosk (2) prompts the user to start the recharge management program.

All these steps (60, 61, 62, 63) are optional steps.

In a fifth step (64), the kiosk (2) displays a barcode composed of the identifier of the kiosk (2) and data about the transaction.

In a sixth step (65), the user acquires the barcode displayed by the kiosk (2) through data acquisition means installed on his mobile terminal (3).

In a seventh step (66), the recharge management program (33) transfers information about the transaction to the recharge server (4).

In an eighth step (67), the recharge server (4) verifies the payment/transaction and authenticates the kiosk (2)/smart card (1).

In a ninth step (68), the recharge server (4) transmits data about the procedure to the recharge kiosk (2) so that the smart card (1) can be credited.

In a tenth step (69), the user puts his smart card (1) on the recharge kiosk (2) so that data about recharging are transmitted to the card (1).

The card is thus credited.

In an eleventh step (691) the kiosk acknowledges recharging.

In the above two implementations of the method, the contactless smart card (1) memorises the result of the recharge procedure, and therefore this card contains all information resulting from this procedure.

When the user would like to recharge his contactless card (1), he goes to a recharge kiosk (2) and starts his recharge management program (33). The user puts his smart card (1) onto the recharge kiosk (2) which then displays a barcode. The recharge management program (33) reads the barcode generated by the kiosk (2) and transmits it to the recharge server (4), using an overcharged SMS. The amount of the overcharge for the SMS is used as an amount to be credited to the smart card (1). The recharge server (4) sends a message indicating the amount to be credited on the card (1) to the recharge kiosk (2) identified through its barcode. This message passes through the local network that connects the recharge kiosk (2) to the recharge server (4). As soon as this message is received, the recharge kiosk (2) sends it to the first contactless smart card (1) that has been placed on it. The smart card (1) is credited by the amount indicated in the message.

It should be obvious to the person skilled in the art that this invention makes possible embodiments in many other specific forms without departing from the field of application of the invention as claimed. Consequently, these embodiments should be considered as illustrations, but they can be modified within the scope defined by the attached claims, and the invention must not be limited to the details given above.

| APPENDIX 1 | | |
|---|---|---|
| 201 | The user puts his contactless smart card onto the recharge kiosk. The card and the kiosk mutually authenticate each other and/or the card transmits data necessary for such mutual authentication of the card and the recharge server, to the kiosk. The card transmits a transaction identifier if necessary. | Optional step |
| 202 | The kiosk displays the available credit and prompts the user to input/select the recharge amount. The user inputs/selects the recharge amount. | Optional step |
| 203 | The kiosk may send the following to the recharge server:<br>kiosk identifier<br>kiosk and/or card authentication data with the recharge server<br>the amount of the transaction, if any<br>a transaction identifier if any (or the recharge server gives an acknowledgement, by supplying a transaction identifier). | Optional step |
| 204 | The kiosk prompts the user to start the recharge management program. | Optional step |
| 205 | The kiosk displays a barcode composed of:<br>the kiosk identifier<br>the transaction identifier if any<br>kiosk authentication data and/or card authentication data, if any, with the recharge server.<br>any data that the customer uses to contact the appropriate recharge server (for example "bearer", connection parameters, address, etc.)<br>the amount of the transaction, if any. | Note that if step 203 was done, the barcode might only contain the transaction identifier. If step 203 was not done, kiosk and/or card identification data will have to be transmitted. Note that if authentication, addressing and amount data are not included the barcode may be static. |
| 206 | The user uses the recharge management program containing barcode reading capabilities to acquire the barcode displayed on the kiosk. | |
| 207 | The recharge management program:<br>contacts the recharge server<br>makes a payment and transmits payment information to the recharge server<br>transmits transaction information, if any, to the recharge server | The payment may be triggered by the recharge server instead of the recharge management program. |
| 208 | The recharge server verifies the payment/transaction and can authenticate the kiosk and/or the card | If the credit system associated with the card is a central system, the recharge server credits the central system. A transaction acknowledgement |

-continued

APPENDIX 1

| | | | |
|---|---|---|---|
| 209 | The recharge server transmits data (for example its authentication data, the signed amount to be credited, etc.), to the recharge kiosk so that the card can be credited. | message may be transmitted to the recharge management program and/or the kiosk, and step 211 is performed. Step 209 does not take place if step 209 B takes place or in the case of the comment mentioned in step 208. | |
| 209 B | The recharge server can acknowledge the recharge to the recharge management program, and the recharge management program can display this acknowledgement to the user. The | Step 209 B does not take place if step 209 takes place or in the case of the comment mentioned | |

-continued

APPENDIX 1

| | | | |
|---|---|---|---|
| | recharge server can transmit data (for example its authentication data, the signed amount to be credited, etc.) to the recharge management program, so that the card can be credited. This information is transmitted from the recharge management program to the recharge kiosk (possibly resulting from action by the user). | in step 208. | |
| 210 | The user puts his contactless smart card on the recharge kiosk. Recharge data are transmitted from the kiosk to the card. The card is credited. | Optional step in the case of the comment in step 208. | |
| 211 | The kiosk acknowledges the recharge | Optional step | |

APPENDIX 2
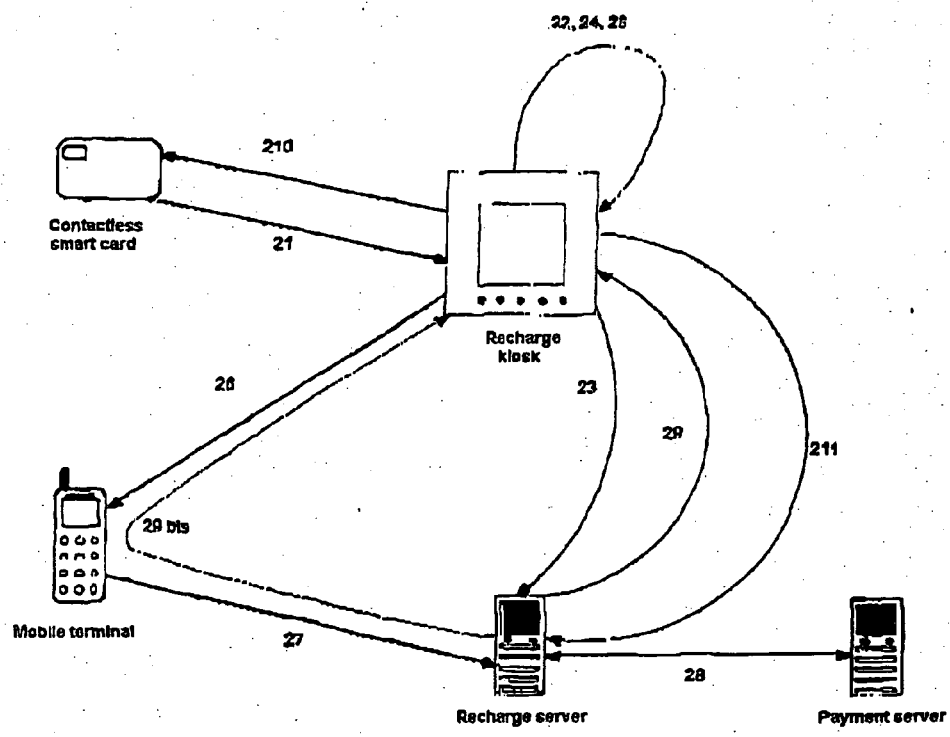

This diagram shows a generic case for recharging a contactless smart card according to the invention. All steps that can take place during the recharge method according to the invention are shown on this diagram.

APPENDIX 3
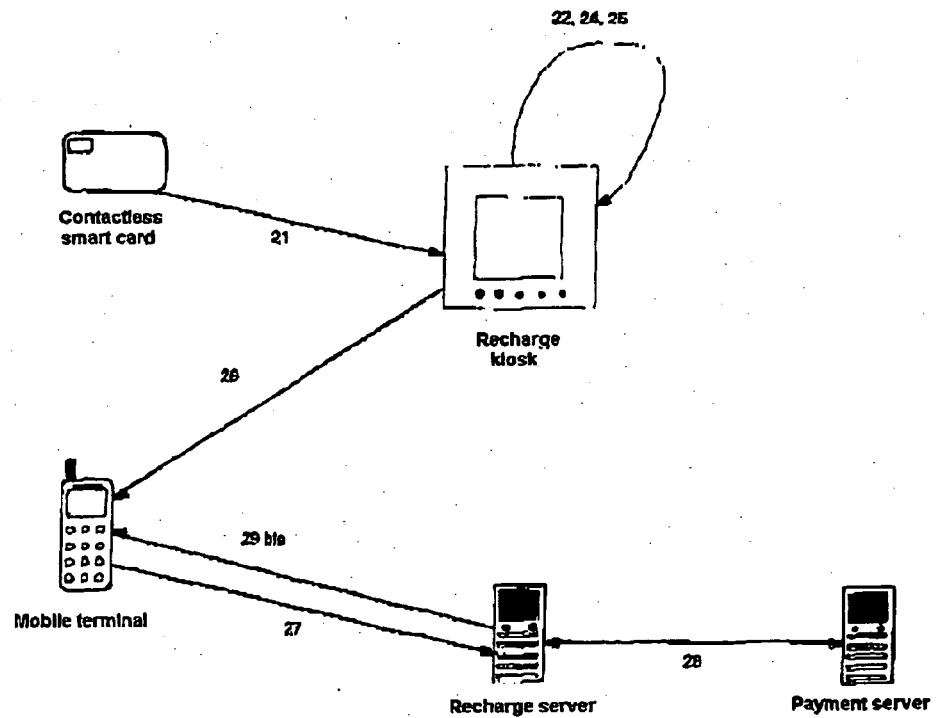

This diagram shows the case in which the credit is stored in the network and in which the recharge server and the recharge kiosk are not connected to each other. In this version of the method, the recharge kiosk and the recharge server do not communicate with each other and the contactless smart card does not receive any information at the end of recharging.

APPENDIX 4
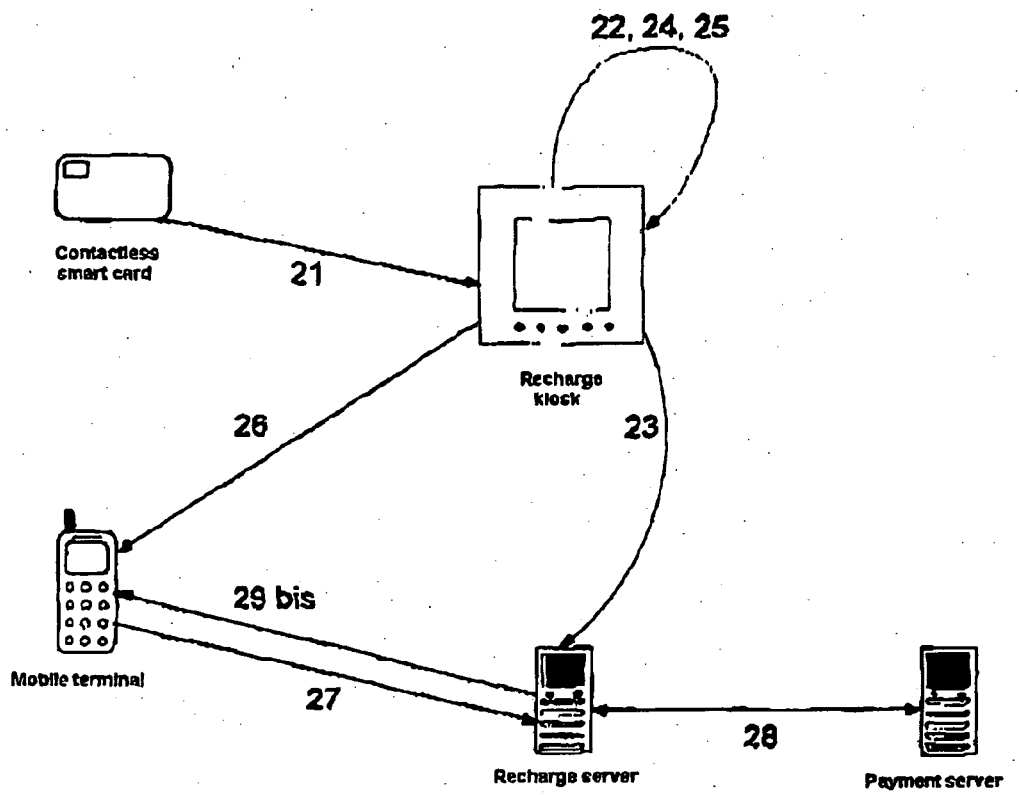

This diagram shows the case in which the credit is stored in the network and in which the recharge server and the recharge kiosk are connected to each other. In this version of the method, the recharge kiosk communicates with the recharge server, providing it with information contained in the card and the contactless smart card does not receive any information after recharging.

APPENDIX 5
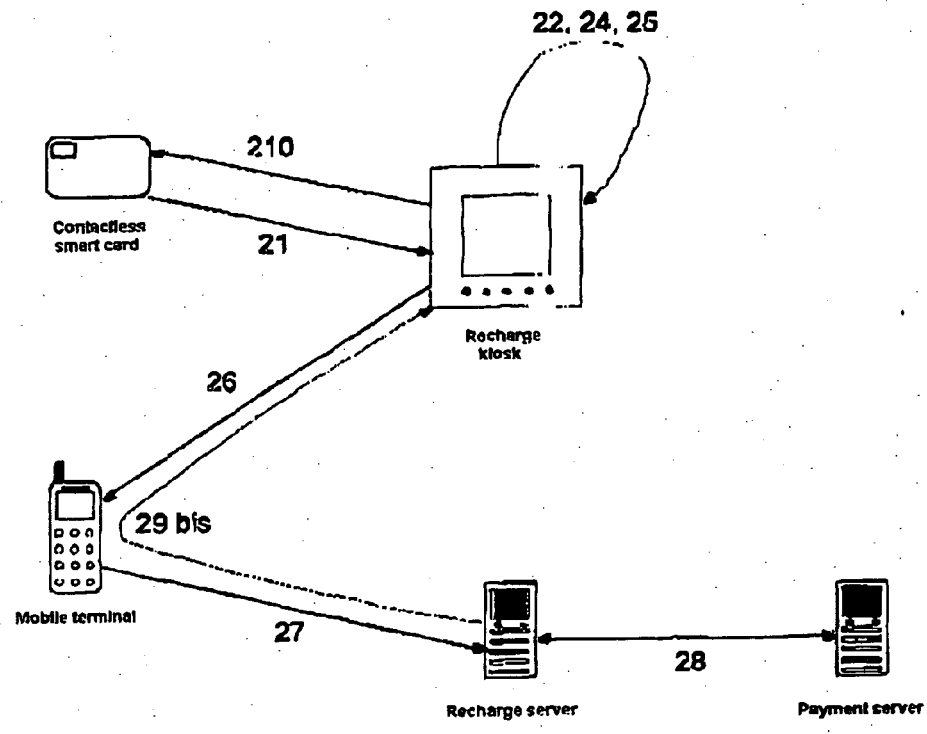

This diagram shows the case in which the credit is stored in the card and in which the recharge server and the recharge kiosk are not connected to each other. In this version of the method, the recharge kiosk and the recharge server do not communicate with each other and the contactless smart card receives information at the end of recharging.

APPENDIX 6
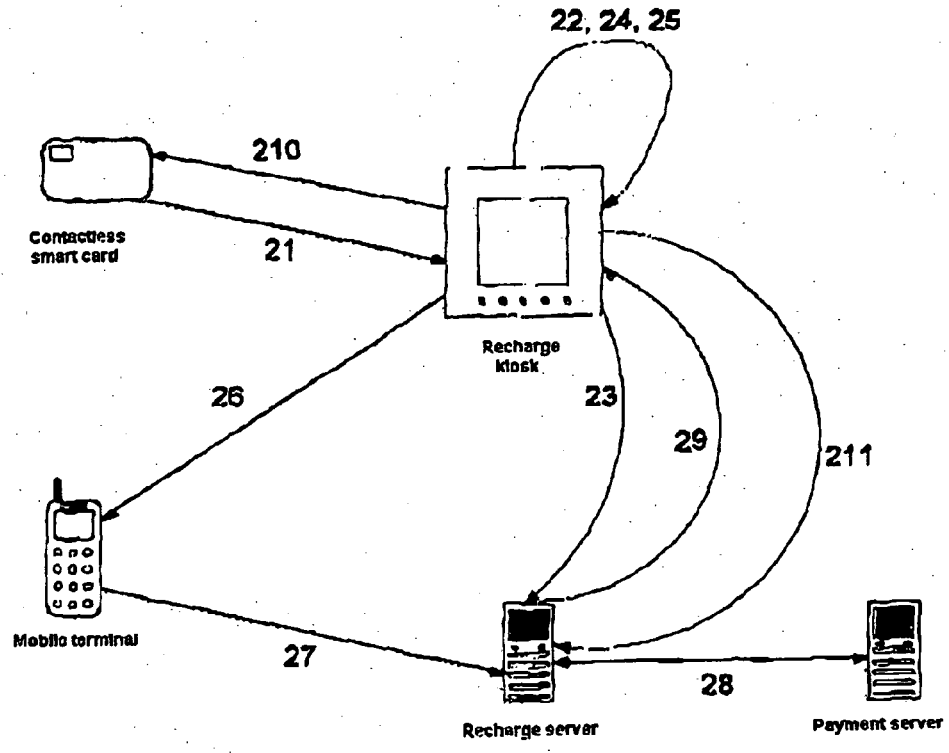

This diagram shows the case in which the credit is stored in the card and the recharge server and the recharge kiosk are connected to each other. In this version of the method, the recharge kiosk communicates with the recharge server and provides it with Information contained in the card, and in return it receives information from the server about the transaction carried out. The contactless smart card then receives all information about recharging.

The invention claimed is:

1. Method for recharging a contactless smart card comprising a payment/transaction through a communication network and identifying the user through an identity module, said method being, implemented by:
    a recharge kiosk having authentication data and communicating with a contactless smart card,
    a mobile terminal provided with shape reading means for acquisition of authentication data,
    a recharge server, and
    a recharge management program communicating with the recharge server,
    wherein the method includes:
        displaying a barcode composed of card or kiosk authentication data, by the recharge kiosk
        acquiring information displayed the shape reading means on the mobile terminal,
        communicating between the recharge management program of the mobile terminal and the recharge server, so that the recharge management program transmits the barcode or part of the information contained in the barcode and performs the payment/transaction,
        verifying the payment/transaction and authenticating the kiosk and/or the smart card, by the recharge server,
        transmitting, directly or indirectly via the mobile terminal, from the recharge server to the data recharge kiosk, so as to credit the smart card,
        transmitting between the recharge kiosk and the contactless smart card, information about completion of the transaction, and crediting the smart card.

2. The method for recharging a contactless smart card according to claim 1, characterised in that it comprises:
    identifying the smart card,
    displaying information on the card by the kiosk,
    communicating between the kiosk and the recharge server,
    prompting, by the kiosk, to start the recharge management program, and
    acknowledging the recharge by the kiosk.

3. The method for recharging a contactless smart card according to claim 2, characterised in that when the credit is stored in the network, the method includes:
    transmitting data, from the recharge server to the recharge management programs, so that the smart card can be credited,
    displaying said data to the user, by the recharge management program, and
    transmitting said data to the recharge kiosk.

4. The method for recharging a contactless smart card according to claim 2, characterised in that when the credit is stored in the smart card, the method includes transmitting data from the recharge server to the recharge management program and using said data to credit the smart card, the recharge management program displaying these data to the user.

5. The method for recharging a contactless smart card according to claim 2, characterised in that when the credit is stored in the smart card, the method includes acknowledging the recharge by the recharge kiosk.

6. The method for recharging a contactless smart card according to claim 1, characterised in that during the communicating between the recharge management program and the recharge server, the recharge server triggers payment instead of the recharge management program.

7. The method for recharging a contactless smart card according to claim 1, characterised in that when the credit system associated with the smart card is a central system, the recharge server directly credits the payment server, the method then goes on from verifying the payment to acknowledging the recharge.

8. The method for recharging a contactless smart card according to claim 1, characterised in that said transmitting indirectly, via the mobile terminal, from the recharge server to the recharge kiosk, comprises:
    transmitting data from the recharge server to the recharge management program so that the smart card can be credited.

9. The method for recharging a contactless smart card according to claim 1, wherein the smart card sends a challenge that is transmitted to the recharge server that signs the challenge—transaction amount pair, and, when the smart card recognises the signature of the recharge server, it credits the amount of the transaction to itself.

10. The method for recharging a contactless smart card according to claim 9, characterised in that the challenge comprises a security mechanism.

11. Method for recharging a contactless smart card according to claim 1, characterised in that, when the credit is stored in the network, the method includes:
    transmitting data, from the recharge server to the recharge management programs so that the smart card can be credited,
    displaying said data to the user, by the recharge management program, and
    transmitting said data to the recharge kiosk.

12. The method for recharging a contactless smart card according to claim 1, characterised in that when the credit is stored in the smart card, the method includes transmitting data from the recharge server to the recharge management program and using said data to credit the smart card, the recharge management program displaying these data to the user.

13. The method for recharging a contactless smart card according to claim 1, characterised in that when the credit is stored in the smart card, the method includes acknowledging the recharge by the recharge kiosk.

* * * * *

UNITED STATES PATENT AND TRADEMARK OFFICE
CERTIFICATE OF CORRECTION

| | |
|---|---|
| PATENT NO. | : 7,543,737 B2 |
| APPLICATION NO. | : 11/116957 |
| DATED | : June 9, 2009 |
| INVENTOR(S) | : Michael Bensimon et al. |

It is certified that error appears in the above-identified patent and that said Letters Patent is hereby corrected as shown below:

In Column 31, Line 51, Claim 3, delete "programs" and insert --program--, therefor.

In Column 32, Line 41, Claim 11, delete "programs" and insert --program--, therefor.

Signed and Sealed this

Fifteenth Day of September, 2009

David J. Kappos
*Director of the United States Patent and Trademark Office*